Patented Sept. 25, 1928.

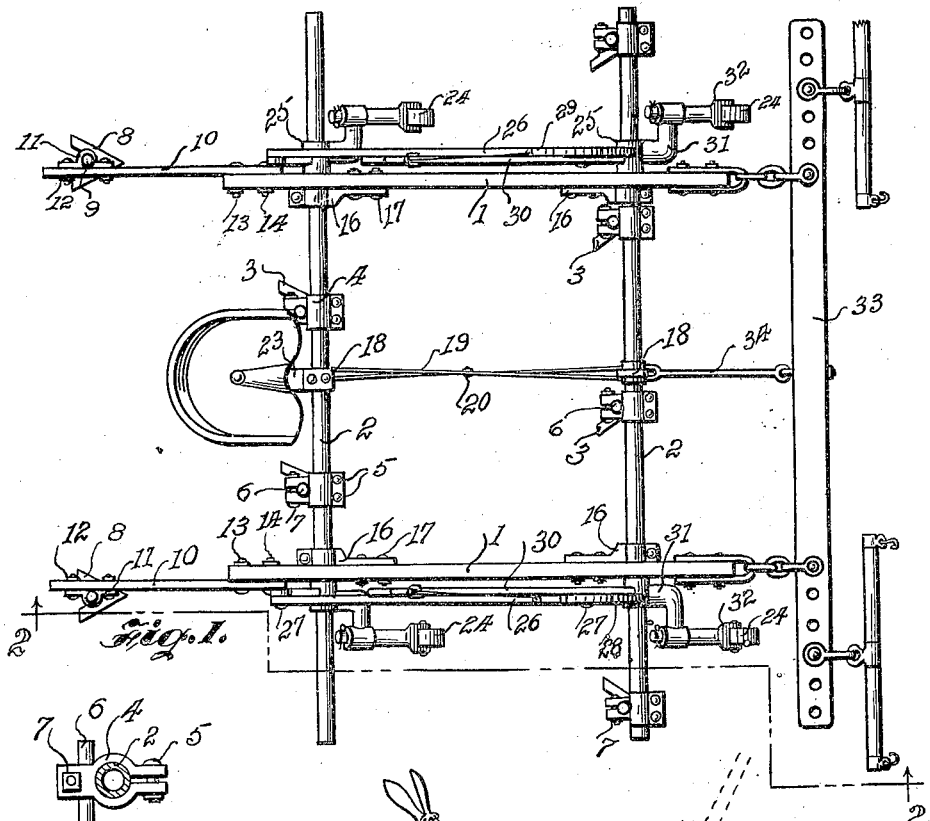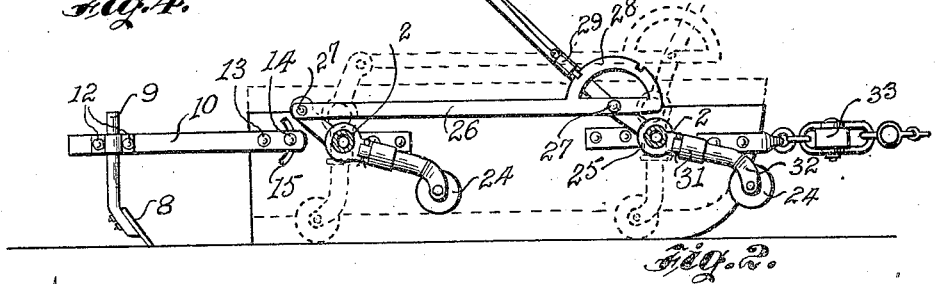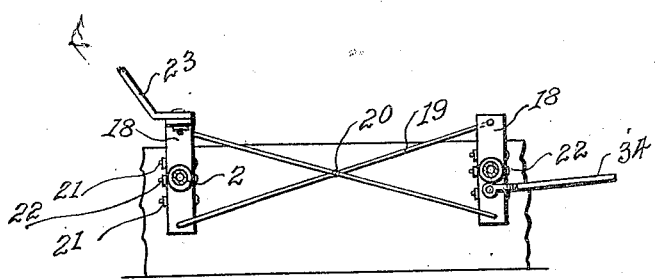

1,685,318

UNITED STATES PATENT OFFICE.

JOHN SAMUEL ELDER, OF GRANDFIELD, OKLAHOMA.

COTTON-CHOPPING MACHINE.

Application filed July 26, 1927. Serial No. 208,489.

This invention relates to certain improvements in machinery used in cultivating cotton, and particularly to a practical and useful machine having for its principal object the rendering of the thinning or chopping and also the cultivation of cotton more expeditious and cheaper.

This invention has for its object the provision of a plant thinning machine having a number of cutting devices which may be easily adjusted to cut spaces of desired width and also stand at any desired inclination relative to the surface of the soil and penetrate the same to any desired degree, thereby simultaneously removing all plants and other vegetation from a number of uniform spaces and also leave uniform spaces with plants standing for further cultivation.

A still further object of the invention is to provide a cross row cotton chopper which will be of extremely simple and durable construction and embodying elevating means to facilitate the turning at the ends of the rows, the transportation from place to place, also the adjustment of the cutting devices and the removal of any undesired accumulations on same.

Furthermore, the particular arrangement of parts results in other objects and advantages which will be apparent during the course of the following detailed description, taken in connection with the accompanying drawings.

Fig. 1 is a plan or vertical view of the machine.

Fig. 2 is a section taken on line 2—2 of Fig. 1.

Fig. 3 is a detailed view showing how the beams 2, 2 in Fig. 1 are braced in the center, and also the location of the seat.

Fig. 4 is a view of the device by which the half sweeps are fastened to the beams, 2, 2, Fig. 1, and also the manner of adjusting the half sweeps vertically.

Fig. 5 shows the clamp placed on the inside in each corner to hold the runners and beams in position.

Referring to the drawings in detail, the supporting parts consist of two runners 1, 1 placed parallel to each other and about five feet apart, each runner having two holes in it about eight inches from the bottom, and about two feet apart through which two round beams 2, 2, Fig. 1 are projected, the end of each beam extending on each side far enough to permit the placing of the device operating as a truck or a carriage on the outside of the runners 1, 1.

The removing of the undesired cotton plants and other vegetation is accomplished by means of half sweeps 3, arranged in pairs, one half sweep 3 of each pair, being placed on a different beam 2, with the wing of each projecting toward the other, thereby moving the loose dirt away from the small plants that are left, thus avoiding covering them up.

The half sweeps 3 are attached to the beams 2, by means of a device shown in Fig. 4, in which a slotted sleeve 4 is clamped to beams 2, by bolt 5. The half sweep 3 is fastened to knee 6, Fig. 4. The sleeve 4 has a slot at the rear to receive knee 6 which is held in position by bolt 7.

It is obvious that as many pairs of half sweeps can be attached as desired, and since each sleeve 4 is removable on beam 2, the half sweeps 3 can be set to cut a space of any desired width up to one equal to the sum of the spaces cut by each; and since the runners 1, 1 are movable on beams 2, 2 it is possible to adjust the machine so as to cut out spaces of any desired and uniform width.

To further accomplish this uniformity a sweep 8, having wings of any desired length is placed behind each runner 1. This is accomplished by fastening said sweep 8 to knee 9, said knee being fastened to bar 10 by clamp 11, said clamp being held by bolts 12. Bar 10 is attached to the runners 1, 1 by means of bolts 13 and 14. Each runner has a segmental slot 15, in which bolt 14 will move as bar 10 is pivoted on bolt 13, thereby permitting the sweep 8 to be set at any desired angle in reference to the land. Since the knee 9 is movable on bar 10 said knee 9 can be moved up or down on bar 10, thereby permitting sweep 8 to be set any desired depth in the ground. The placing of said sweep 8 behind each runner not only makes it possible to leave spaces of uniform width uncut but it also makes it possible to make use of runners having a broad base, thereby preventing the runners from cutting too deeply into the loose ground.

The runners 1, 1 and beams 2, 2 are held in position by means of clamp braces 16 one brace 16 being placed in each corner of the rectangle formed by runners 1, 1 and beams 2, 2 said braces 16 being adjustably attached to beams 2, 2 with the arm of each brace parallel to runners 1, 1 and when a rigid frame is desired the arms of braces 16 are attached to runners 1, 1 by means of bolts 17.

The beams 2, 2 are prevented from tilting or turning by means of clamps 18, one on each beam, having arms extending above and below said beams to which are attached bars 19 crossing each other and being fastened in the center by bolt 20. Clamps 18 are drawn tightly to each beam 2 by bolt 22 and each clamp 18 is further secured from turning on said beam 2 by means of bolt 22 passing through both clamp 18 and beam 2. 23 shows extension of arm on rear clamp 18 to which a seat is attached.

The machine is supplied with caster-wheels 24, 24 placed on the beams 2, 2. 25 shows cuffs which slip over beams 2, 2 and are movable on them. Each cuff 25 has an arm extending upward to which bar 26 is pivoted at 27. 26 has an arched bar 28 attached to it in which notches are cut to receive the plunger 29 on lever 30, the object of which is to hold the caster-wheels 24 in the desired position.

Each cuff 25 also has a projection extending downward and outward, each projection having a hole in it to receive the end of the fork 32 holding the wheels 24. The fork 32 is prevented from falling out of the hole in which it is placed by means of a cotter key extending through the upper end of said fork.

It can be readily seen by referring to Fig. 2 that when the lever 30 is moved forward the wheels 24 will engage the ground, as shown by dotted lines, and have a tendency to lift that side of the machine clear of the ground, and it is clear that the other pair on the other side would do likewise, since both pairs are similarly constructed, and when both levers are moved forward far enough the entire machine, except the wheels, is cleared of the ground.

The draft attachment 33 is attached to runners 1, 1 by means of clevises and the draft attachment 33 and front beam 2, are fastened together by links 34.

By reference to the detailed description and drawing it will be readily seen that by loosening the nut on bolt 5, sleeve 4 can be moved either way on beam 2, thereby permitting knee 6 to be adjusted, longitudinally on beam 2 as desired and by turning sleeve 4 on beam 2 knee 6 can be changed from a vertical position toward a horizontal one, thereby changing the angle of the cutting devices as desired and by loosening the nut on bolt 7 knee 6 can be adjusted vertically, thereby setting the cutting devices so they will operate at a desired depth and since knee 6 is round it can be turned in the slot in sleeve 4, thereby permitting the wing or blade of the half-sweep attached to knee 6 to be set at any desired angle in reference to the planted row.

The machine is operated by dragging it across the field in parallel rows or lines and as nearly as can be at right angles to the planted rows.

Having described my invention, I claim:—

1. A plant thinning machine comprising parallel runners, beams mounted transversely of the runners and relative to which said runners are adapted to be adjusted longitudinally, means for retaining the runners and beams in adjusted position, spaced cutting devices attached to the beams and transport means for said machine carried thereby.

2. A plant thinning machine comprising parallel runners provided with spaced openings, beams projecting thru said openings permitting adjustment of the runners longitudinally thereof, means for retaining the runners and beams in adjusted position, spaced cutting devices attached to the beams and transport means for said machine carried thereby.

3. A plant thinning machine comprising parallel runners, beams mounted transversely of the runners and relative to which said runners are adapted to be adjusted longitudinally, means for retaining the runners and beams in adjusted position, spaced cutting devices attached to the beams and adjustable thereon longitudinally, and transport means for said machine carried thereby.

4. A plant thinning machine comprising parallel runners, beams mounted transversely of the runners and relative to which said runners are adapted to be adjusted longitudinally, means for retaining the runners and beams in adjusted position, spaced cutting devices attached to the beams and adjustable thereon longitudinally and vertically, and transport means for said machine carried thereby.

In testimony whereof I affix my signature.

JOHN SAMUEL ELDER.